(12) United States Patent
Royt et al.

(10) Patent No.: US 9,967,232 B1
(45) Date of Patent: May 8, 2018

(54) NETWORK TRAFFIC MANAGEMENT SYSTEM USING CUSTOMER POLICY SETTINGS

(71) Applicant: Amazon Technologies, Inc., Seattle, WA (US)

(72) Inventors: Sergey Royt, Seattle, WA (US); Lee-Ming Zen, Seattle, WA (US); Kalyanaraman Prasad, Sammamish, WA (US); Valeri Liborski, Bellevue, WA (US); Nicholas Trebon, Chicago, IL (US); Sean Henry Lewis Meckley, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 450 days.

(21) Appl. No.: 14/617,608

(22) Filed: Feb. 9, 2015

(51) Int. Cl.
*H04L 29/12* (2006.01)

(52) U.S. Cl.
CPC ...... *H04L 61/3025* (2013.01); *H04L 61/6004* (2013.01)

(58) Field of Classification Search
USPC .......................... 709/217, 219, 223, 226, 229
See application file for complete search history.

(56) References Cited

U.S. PATENT DOCUMENTS

| | | | |
|---|---|---|---|
| 2008/0207200 A1* | 8/2008 | Fein | H04B 1/38 455/426.1 |
| 2011/0093522 A1* | 4/2011 | Chen | H04L 29/12066 709/203 |
| 2014/0280305 A1* | 9/2014 | James | H04L 61/1511 707/769 |
| 2014/0304412 A1* | 10/2014 | Prakash | H04L 61/1511 709/226 |

* cited by examiner

*Primary Examiner* — Liangche A Wang
(74) *Attorney, Agent, or Firm* — Klarquist Sparkman, LLP

(57) ABSTRACT

A service is described that makes it easy and cost-effective to configure network traffic flowing to multiple endpoints. Enterprises and developers can easily manage the way that end-users are routed to applications running in different geographic regions. Customers can route traffic based on multiple criteria in a customer policy. Customers can manage large-scale, multi-region applications, increase application availability, and minimize latency to end-users. The service can consider the state of end-users, such as their geography, their network, and their latency to different geographic regions. The service can also consider the state of the customer's applications, such as the load on the application, the application's health, the cost of using that application (e.g., resource costs), resource states (e.g., disk throughput), resource location, customer-provided endpoint cost parameters, etc.

23 Claims, 9 Drawing Sheets

NETWORK TRAFFIC MANAGEMENT SYSTEM USING CUSTOMER POLICY SETTINGS

BACKGROUND

The Domain Name System (DNS) is a hierarchical distributed naming system for computers, services, or any resource connected to the Internet. It associates various information with domain names assigned to each of the participating entities. Most prominently, it translates domain names, which can be easily memorized by humans, to numerical Internet Protocol (IP) addresses needed for the purpose of computer services and devices worldwide.

The DNS includes authoritative DNS servers (called DNS hosting services or name servers) that are responsible for translating domain names into IP addresses. DNS servers can also be arranged in hierarchies where each level of authoritative DNS server is responsible for a level of a domain. Whenever an application uses a domain name when requesting network services, a DNS hosting service receives the request and translates the domain name into the corresponding IP address. For example, the domain name "www.amazon.com" might translate to 114.859.214.141.

Cloud computing is the use of computing resources (hardware and software) which are available in a remote location and accessible over a network, such as the Internet. Users are able to buy these computing resources (including storage and computing power) as a utility on demand. Cloud computing entrusts remote services with a user's data, software and computation. Use of virtual computing resources can provide a number of advantages including cost advantages and/or ability to adapt rapidly to changing computing resource needs.

Customer applications running in a cloud environment desire to have control regarding how end users are routed to the customer applications. However, currently little control is provided. And when some customer control is allowed, such as through an API, the control is very specific to one function, which is inefficient and burdensome to the customers.

DETAILED DESCRIPTION

A service is described that makes it easy and cost-effective to configure network traffic flowing to multiple endpoints. Enterprises and developers can easily manage the way that end-users are routed to applications running in different geographic regions. Customers can route traffic based on multiple criteria that can combine information about applications running in a cloud environment and end-users. Similarly, customers can provide different DNS answers based on these same criteria and information about applications running in a cloud environment and end-users. Customers can manage large-scale, multi-region applications, increase application availability, and minimize latency to end-users.

The service can consider the state of end-users, such as their geography, their network, and their latency to different geographic regions. Other end-user parameters can include the end-user Classless Inter Domain Routing (CIDR) and the end-user Autonomous System Number (ASN). The service can also consider the state of the customer's applications, such as the load on the application, the application's health, the cost of using that application (e.g., resource costs), resource states (e.g., disk throughput), resource location, customer-provided endpoint cost parameters, etc.

Customers can choose from a library of templates that suit their traffic management needs, and customers can customize these templates or build policies from scratch using a simple intent-based model. Customers can further configure multiple routing policies and decide which policies are active at any given time. Each policy has various parameters, all configurable through a Graphical User Interface (GUI) or Application Programming Interface (API) so as to dictate traffic flow decisions, such as the maximum load an endpoint should receive. Customers can view the results of routing decisions in near real-time, such as a visualization of how network traffic flows to endpoints. Customers can analyze this information to help adjust their routing parameters to optimize traffic flowing to their endpoints. In addition, customers can use the service to optimize traffic flows between various parts of the application itself, such as between web servers and application servers, caches, or databases.

Through Application Programming Interfaces (API), a set of operations allows customers to programmatically make policy adjustments to their accounts. A policy can adjust multiple constraints (also called parameters). For example, a policy can call for geographic restriction and load balancing. In a management console, a customer can examine the traffic flow with a visualization tool. The visualization allows a break down where end-users are being routed. For example, "Japan" can be selected to see a diagram and report of exactly where the system routed end-users from Japan. Customers can also select an endpoint to inspect the sources of incoming traffic.

Figure 1:
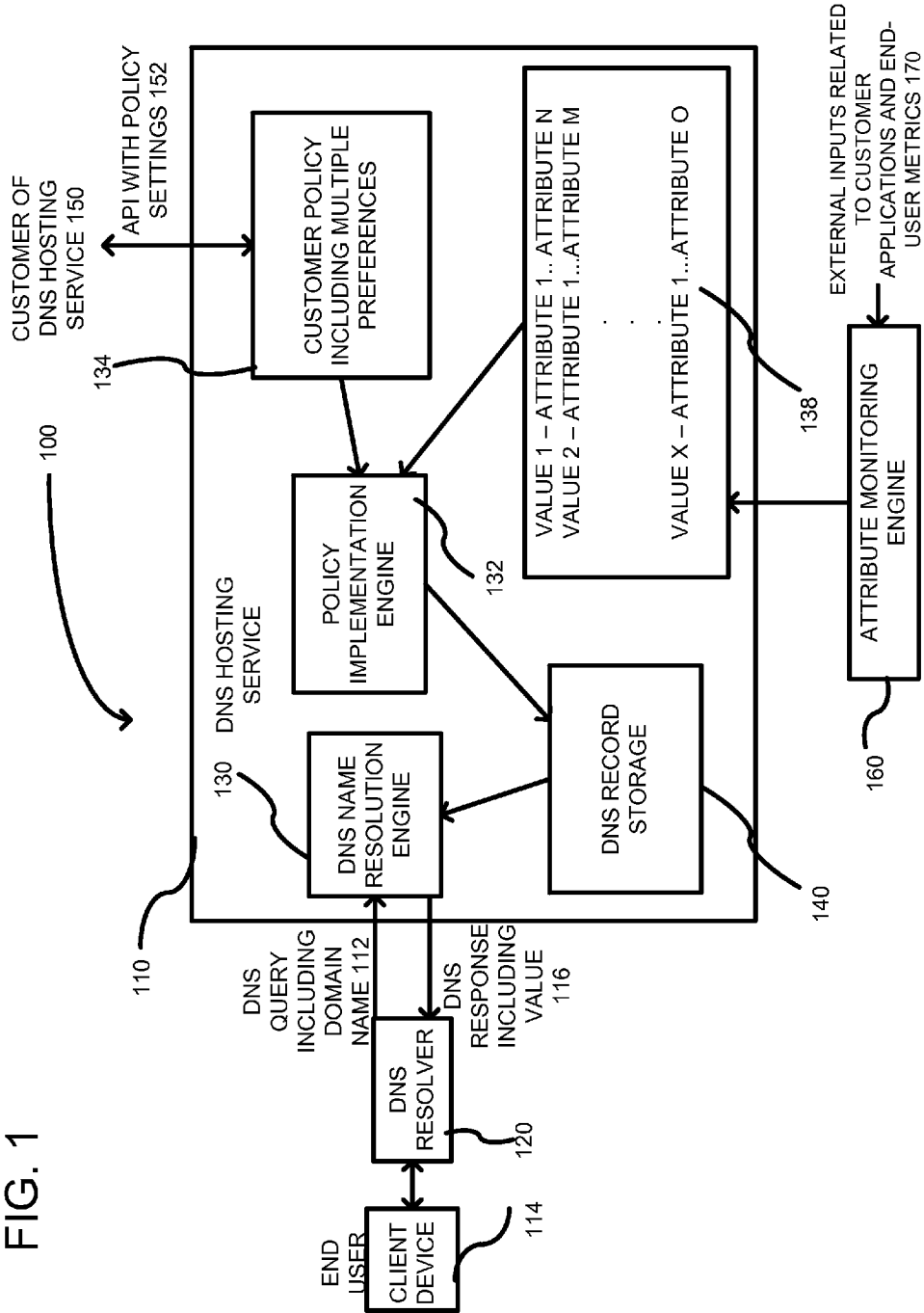
FIG. 1 is an example DNS hosting service according to one embodiment.

FIG. 1 shows an example system 100 for processing a Domain Name System (DNS) request. The system 100 includes a DNS hosting service 110 that can include one or more server computers. The DNS hosting service 110 receives DNS queries 112, including a domain name, from a client device/end user 114. The DNS queries can also include other parameters, such as a type. The client device can be any of a variety of computing devices, mobile or otherwise including a cell phone, smartphone, handheld computer, Personal Digital Assistant (PDA), desktop computer, etc. In response to the DNS query 112, the DNS hosting service 110 provides a DNS response 116 that includes an associated value. The value can be any text or alpha-numeric value, such as an address (e.g., IP address), resource identifier, CNAME, signature, public key, etc. A DNS resolver 120 can be positioned between the client device 114 and the DNS hosting service 110 as is well understood in the art. The DNS resolver 120 initiates and sequences the queries that ultimately lead to a full resolution (translation) of the resource sought, e.g., translation of a domain name into a value, as is well understood in the art.

The DNS hosting service 110 can have a variety of structures, but one example structure shown in FIG. 1 includes a DNS name resolution engine 130, a policy implementation engine 132, storage 134 for a customer policy, a value/attribute table 138, and DNS record storage 140. The DNS name resolution engine 130 receives the DNS query 112 and provides the DNS response 116 by simply performing a name lookup in the DNS record storage 140 and reading an associated value. Thus, for example, a domain name can be for "Amazon.com®" and the domain name is used as a key to search in the DNS record storage 140. Each domain name can include one or more associated values, which can be used by the DNS name resolution engine to generate the response 116. The policy implementation engine 132 can populate the DNS record storage 140 at periodic intervals so as to dynamically conform to the customer policy based on a variety of potential input metrics that relate to the end users and/or the customer applications.

The customer policy 134 can be controlled through API requests from a customer 150. The customer 150 is typically a company, such as Amazon.com®, and the end user 114 is a user of the company's service, such as a consumer. The customer 150 can update their policy settings 134 using one or more APIs 152. The customer policy can control multiple domain names relating to the same company (e.g., Amazon.com, Amazonmobile.com, etc.) and each domain name can have different policies associated therewith. Each policy has multiple parameters associated therewith that define a goal indicative of how network traffic should be routed for the particular domain name. In one simple example the customer can set three parameters: for end users in Western Europe, load should not exceed 70% and cost should not exceed X Euros. As described further below, the customer goal can be defined in a number of ways, such as an ordered preference list, a weighted optimization problem, etc.

The value/attribute table 138 includes a pool of candidate values that can be used by the policy implementation engine 132 to populate the DNS record storage 140. Each value has two or more attributes associated therewith. The attributes can be dynamically and periodically updated by an attribute monitoring engine 160, which can read both application metrics and end-user metrics 170, as further described below. The attributes in the value/attribute table 138 are scaled metrics, such as relating to application load, cost, health, location, etc. The attributes in the table 138 can also be received from the DNS query 112 itself. For example, the end user address, network, location, latency information, etc., can be either received directly from the end user query or derived therefrom.

The policy implementation engine 132 reads the current policy 134 and the candidate values in the value/attribute table 138 and based on the multiple parameters in the customer policy, determines which value or values in the value/attribute table 138 best matches the policy for a domain name. Based on the determination, the policy implementation engine 132 can update the DNS record storage 140 to deliver the updated value to the end user upon receiving a DNS query 112. For example, the policy implementation engine 132 can read the multiple parameters that are the most important to the customer and then look at the attributes in the value/attribute table to see which value is most favorable. If the customer is concerned about cost, then a value can be selected that has an attribute indicating low cost, etc. That value can then be updated in the DNS record storage so that it can be delivered to the end user in future DNS requests.

The DNS query 112 and API policy settings requests 152 are generally accomplished using API requests in association with web services, but other implementations and requests can be used. Web services are commonly used in cloud computing. A web service is a software function provided at a network address over the web or the cloud. Clients initiate web service requests to servers and servers process the requests and return appropriate responses. The client web service requests are typically initiated using, for example, an API request. For purposes of simplicity, web service requests will be generally described below as API requests, but it is understood that other web service requests can be made. An API request is a programmatic interface to a defined request-response message system, typically expressed in JSON or XML, which is exposed via the web—most commonly by means of an HTTP-based web server. Thus, in certain implementations, an API can be defined as a set of Hypertext Transfer Protocol (HTTP) request messages, along with a definition of the structure of response messages, which can be in an Extensible Markup Language (XML) or JavaScript Object Notation (JSON) format. The API can specify a set of functions or routines that perform an action, which includes accomplishing a specific task or allowing interaction with a software component. When a web service receives the API request from a client device, the web service can generate a response to the request and send the response to the endpoint identified in the request.

Using API requests, the customer can setup an overall goal through specification of the parameters in the policy. The parameters can be used as weighting against the scaled metrics in the value/attribute table 138 so as to implement the customer policy.

Figure 2:
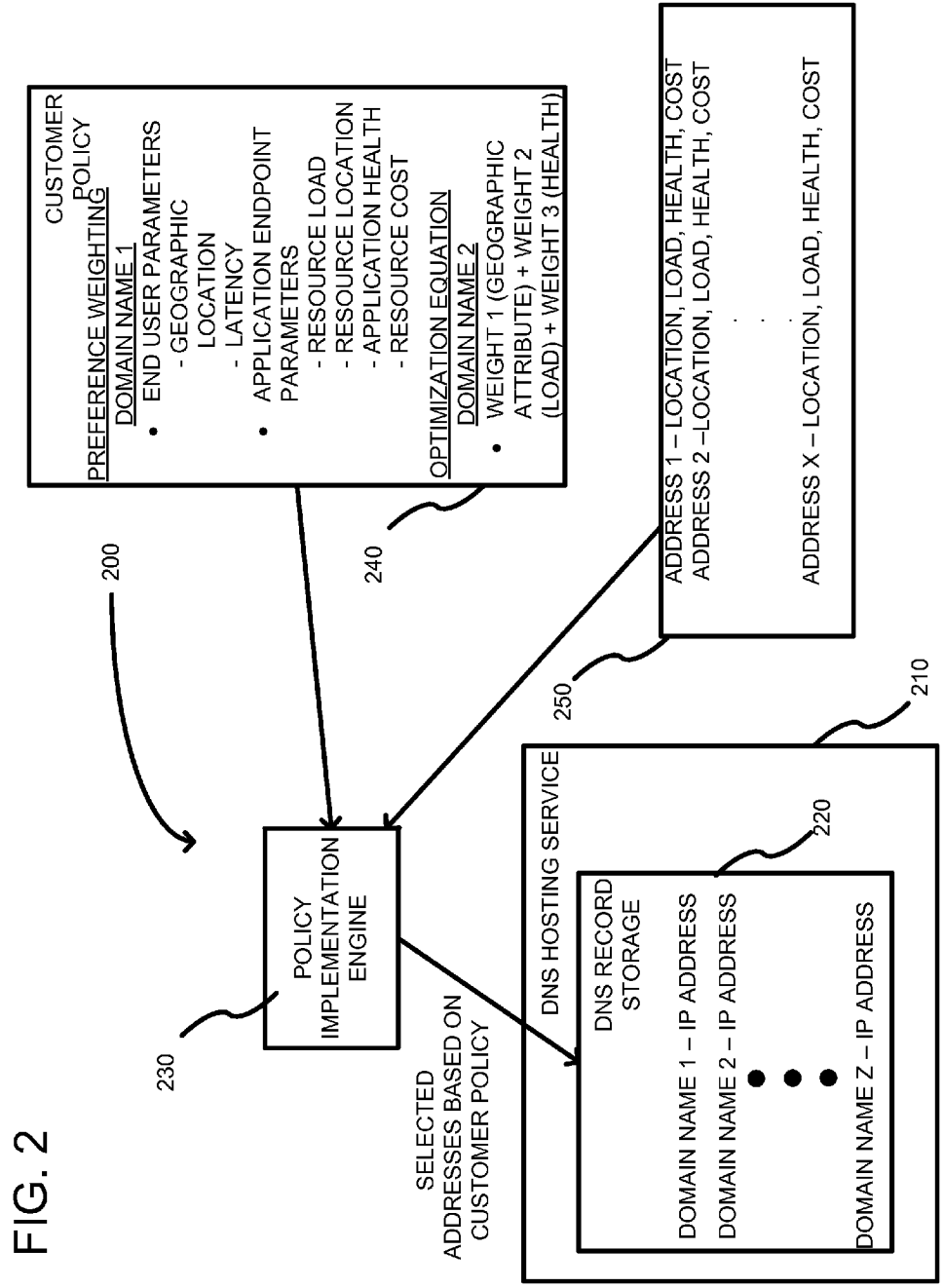
FIG. 2 is a second embodiment including a DNS hosting service.

FIG. 2 shows another embodiment of a system 200 for processing DNS requests. In this embodiment, a DNS hosting service 210 can be similar to that of FIG. 1 and can include a DNS name resolution engine (not shown). The DNS hosting service 210 can be implemented on one or more server computers. Additionally, a DNS record storage 220 is shown in memory or on a hard drive of a DNS server, but can be stored externally of the server computer, such as in an external database. In this example, the domain names are shown as being associated with particular IP addresses, although any desired values can be used, as described above, such as an address, resource identifier, or CNAME. The IP addresses associated with the domain names are dynamically updatable by a policy implementation engine 230, which in this example is external to the DNS hosting service 210. The policy implementation engine 230 can read a customer policy 240 and an address/attribute table 250 to make dynamic updating decisions regarding addresses in the DNS record storage. The policy implementation engine 230 makes the updating decisions based upon real-time metrics related to running customer applications. Example metrics include customer application metrics, end-user metrics, etc.

The metrics can be hardware resource metrics, such as CPU usage, load, latency, cost, health, location, etc., some of which are shown in the table 250. Each of the policy implementation engine 230, the customer policy 240 and the address/attribute table 250 are shown external to the DNS hosting service 210. However, one or more of these components can be incorporated into the DNS hosting service, if desired.

The customer policy 240 is illustrated with different possible formats for using multiple parameters. For example, a "domain name 1" is shown having a preference list divided between end-user parameters and application endpoint parameters. The preference list can be organized in a priority order. Example end-user parameters can include geographic location of the end user and latency of a connection to different geographic regions. Example application end-point parameters include resource load, resource geographic location, application health, and resource cost. For a "domain name 2", a different structure is used for the preferences. In this case, there is a weighted formula or equation where different weights are associated with different parameters. Thus, the policy can be setup as an optimization problem or equation that can be solved by the policy implementation engine 230 using real-time metrics in the address/attribute table 250. Regardless of the format, the policy includes multiple parameters that are used to define a customer goal, and those parameters are used to match an appropriate address in the table 250. Only two domain names are shown for simplicity, but any number of domain names can be supported. Additionally, a variety of parameters are shown, but any of the parameters can be eliminated and others added.

Figure 3:
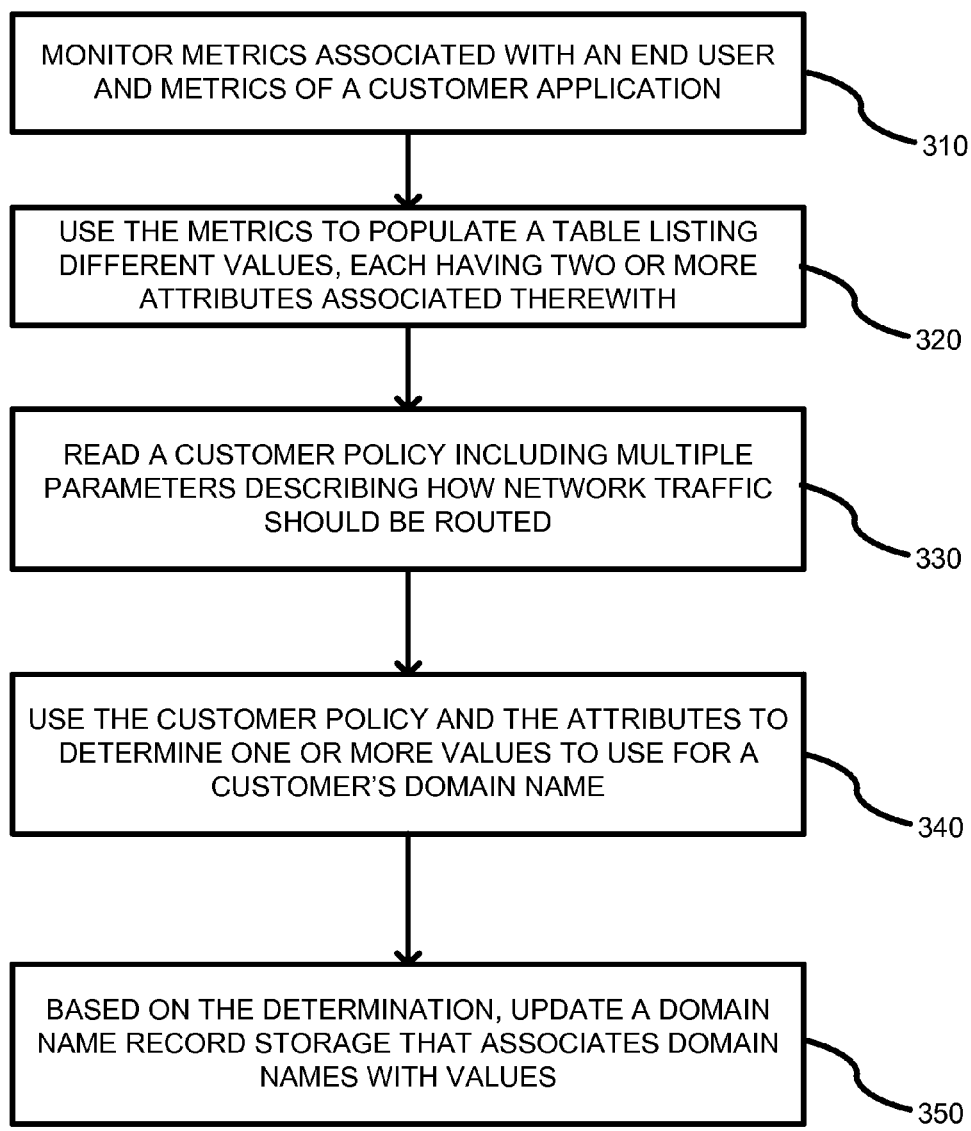
FIG. 3 is a flowchart describing use of the embodiments of FIGS. 1 and 2.

FIG. 3 is an example flow diagram illustrating how the embodiments of FIG. 1 and FIG. 2 can operate. In process block 310, metrics are monitored that are associated with the end user. Additionally, or alternatively, metrics associated with a customer application can be monitored. Monitoring the metrics typically includes performing a periodic pull of information from various resources, but push implementations can also be used. In process block 320, the metrics are used to populate a table listing different values, each value having two or more attributes associated therewith. Example metrics that are transformed into attributes include a current load on an application, a cost associated with the application, health of the application, any hardware metrics (e.g., CPU load, memory use, etc.) associated with executing the application on a resource, etc. Generally, the metrics correspond directly to the attributes, but some mathematical processing can be performed to convert the metrics into the attributes. For example, a scaling can be performed so that all of the attributes in the table can be similarly compared. In process block 330, a customer policy can be read including multiple parameters that describe how network traffic should be routed for a customer's domain name. By defining multiple parameters, a customer can define a goal of how network traffic should be routed or different answers should be computed for the customer's domain name. The multiple parameters relate directly to the metrics being monitored in process block 310. In process block 340, the customer policy and the attributes are used to determine one or more values to use for the customer's domain name. Multiple parameters in the policy are weighed against the attributes so as to draw a conclusion on which value is best suited to match the policy. For example, the policy can have a weighting for different of the attributes so that a mathematical formula can be used combining the weightings and attributes. As a result, a decision can be made based on multiple of the policy parameters which numerical value is best suited for a given domain name. A simple formula could be parameter1(location attribute)+parameter2(load attribute)+parameter3(cost attribute)+parameter4(health attribute). Such a formula can be applied against multiple values to see which value most favorably matches the customer's policy. In process block 350, based on the determination, a domain name record storage is updated so that the customer's domain is linked to the determined value. In the alternative, process block 350 can be eliminated and, instead, the value can be determined dynamically in response to the user request, without the need to pre-store the values. Using the above-described process blocks, the system can dynamically update the domain name record storage based on multiple input metrics associated with static (e.g., cost, location, etc.) and dynamic (load, health, etc.) metrics related to the customer's domain name.

Figure 4:
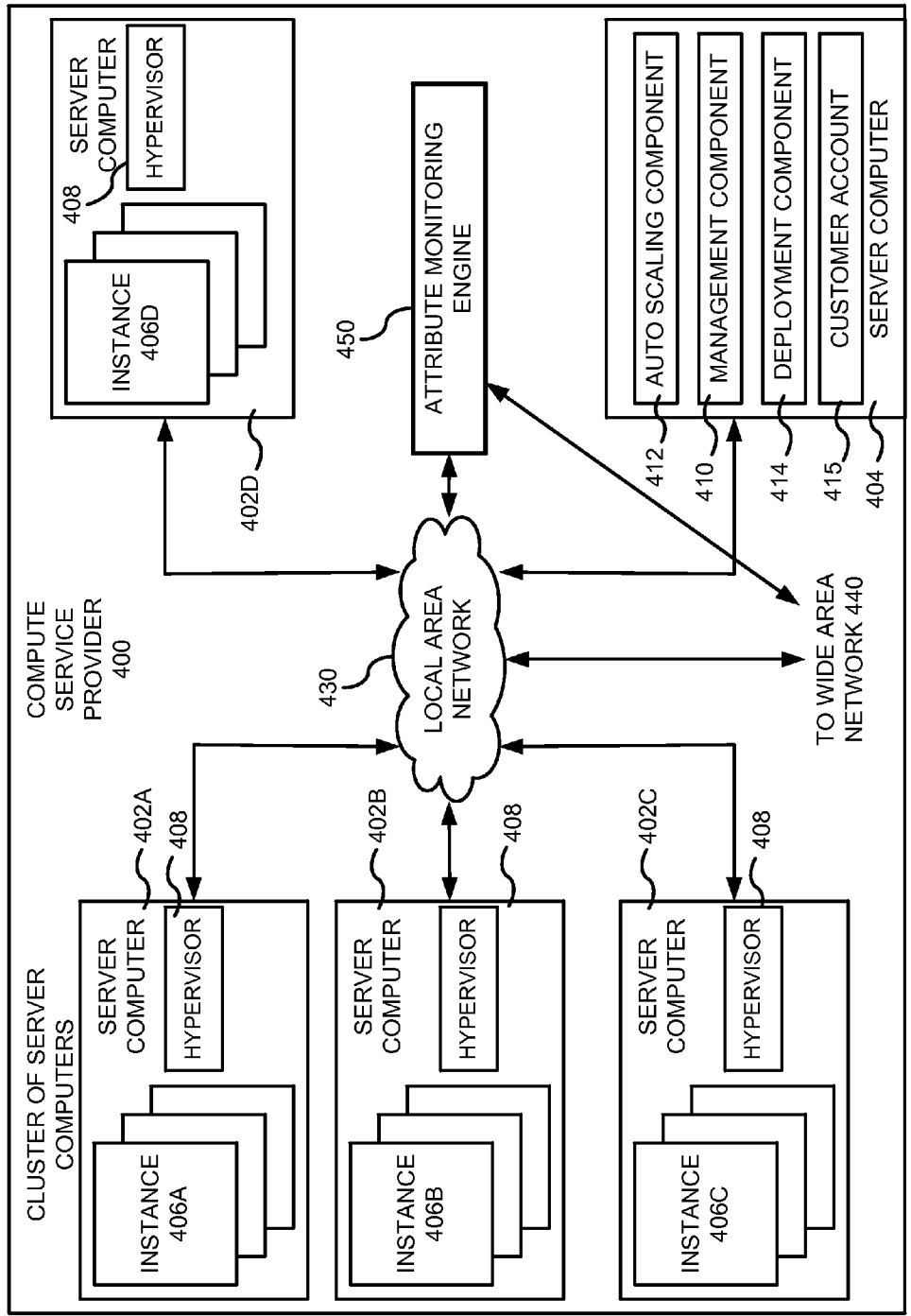
FIG. 4 is an example system diagram showing a plurality of virtual machine instances running in the multi-tenant environment.

FIG. 4 is a computing system diagram of a network-based compute service provider 400 that illustrates one environment from which the metrics can be obtained. By way of background, the compute service provider 400 (i.e., the cloud provider) is capable of delivery of computing and storage capacity as a service to a community of end recipients. In an example embodiment, the compute service provider can be established for an organization by or on behalf of the organization. That is, the compute service provider 400 may offer a "private cloud environment." In another embodiment, the compute service provider 400 supports a multi-tenant environment, wherein a plurality of customers operate independently (i.e., a public cloud environment). Generally speaking, the compute service provider 400 can provide the following models: Infrastructure as a Service ("IaaS"), Platform as a Service ("PaaS"), and/or Software as a Service ("SaaS"). Other models can be provided. For the IaaS model, the compute service provider 400 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. The SaaS model allows installation and operation of application software in the compute service provider. In some embodiments, end users access the compute service provider 400 using networked client devices, such as desktop computers, laptops, tablets, smartphones, etc. running web browsers or other lightweight client applications. Those skilled in the art will recognize that the compute service provider 400 can be described as a "cloud" environment.

The particular illustrated compute service provider 400 includes a plurality of server computers 402A-402D. While only four server computers are shown, any number can be used, and large centers can include thousands of server computers. The server computers 402A-402D can provide computing resources for executing software instances 406A-406D. In one embodiment, the instances 406A-406D are virtual machines. As known in the art, a virtual machine is an instance of a software implementation of a machine (i.e. a computer) that executes applications like a physical machine. In the example of virtual machine, each of the servers 402A-402D can be configured to execute a hypervisor 408 or another type of program configured to enable the execution of multiple instances 406 on a single server. Additionally, each of the instances 406 can be configured to execute one or more applications.

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

One or more server computers 404 can be reserved for executing software components for managing the operation of the server computers 402 and the instances 406. For example, the server computer 404 can execute a management component 410. A customer can access the management component 410 to configure various aspects of the operation of the instances 406 purchased by the customer. For example, the customer can purchase, rent or lease instances and make changes to the configuration of the instances. The customer can also specify settings regarding how the purchased instances are to be scaled in response to demand. The management component can further include a policy document to implement customer policies. An auto scaling component 412 can scale the instances 406 based upon rules defined by the customer. In one embodiment, the auto scaling component 412 allows a customer to specify scale-up rules for use in determining when new instances should be instantiated and scale-down rules for use in determining when existing instances should be terminated. The auto scaling component 412 can consist of a number of subcomponents executing on different server computers 402 or other computing devices. The auto scaling component 412 can monitor available computing resources over an internal management network and modify resources available based on need.

A deployment component 414 can be used to assist customers in the deployment of new instances 406 of computing resources. The deployment component can have access to account information associated with the instances, such as who is the owner of the account, credit card information, country of the owner, etc. The deployment component 414 can receive a configuration from a customer that includes data describing how new instances 406 should be configured. For example, the configuration can specify one or more applications to be installed in new instances 406, provide scripts and/or other types of code to be executed for configuring new instances 406, provide cache logic specifying how an application cache should be prepared, and other types of information. The deployment component 414 can utilize the customer-provided configuration and cache logic to configure, prime, and launch new instances 406. The configuration, cache logic, and other information may be specified by a customer using the management component 410 or by providing this information directly to the deployment component 414. The instance manager can be considered part of the deployment component.

Customer account information 415 can include any desired information associated with a customer of the multi-tenant environment. For example, the customer account can include the customer policy on how to resolve domain names. Additionally, the customer account information can include a unique identifier for a customer, a customer address, billing information, licensing information, customization parameters for launching instances, scheduling information, auto-scaling parameters, previous IP addresses used to access the account, etc.

A network 430 can be utilized to interconnect the server computers 402A-402D and the server computer 404. The network 430 can be a local area network (LAN) and can be connected to a Wide Area Network (WAN) 440 so that end users can access the compute service provider 400. It should be appreciated that the network topology illustrated in FIG. 4 has been simplified and that many more networks and networking devices can be utilized to interconnect the various computing systems disclosed herein.

An attribute monitoring engine 450 can be executing on a server computer within the compute service provider environment. The attribute monitoring engine 450 can receive external metric inputs related to customer applications and end-user metrics. Example metrics can include load, cost, health, location, CPU bandwidth, memory bandwidth, etc. Virtually any software or hardware metrics can be monitored and obtained. The attribute monitoring engine 450 can then pass the metric data directly to a DNS hosting service (not shown) or scale the metrics to generate uniform attributes that can be transmitted to the DNS hosting service so as to populate the value/attribute table, such as is shown at 138 in FIG. 1. As shown, the attribute monitoring engine 450 can be coupled to the local area network 430 or to the wide area network 440. Thus, the attribute monitoring engine 440 can receive metric data from the instances 406 through the local area network 430 and can receive metric data directly from customers, such as through the Internet so that customers can report any desired metric data (e.g., application load, network metrics, etc.)

Although a compute service provider is shown in FIG. 4, the customer applications need not be executing within a compute service provider. Instead, the customer applications can be executing on stand-alone server computers outside of a compute service provider environment.

Figure 5:
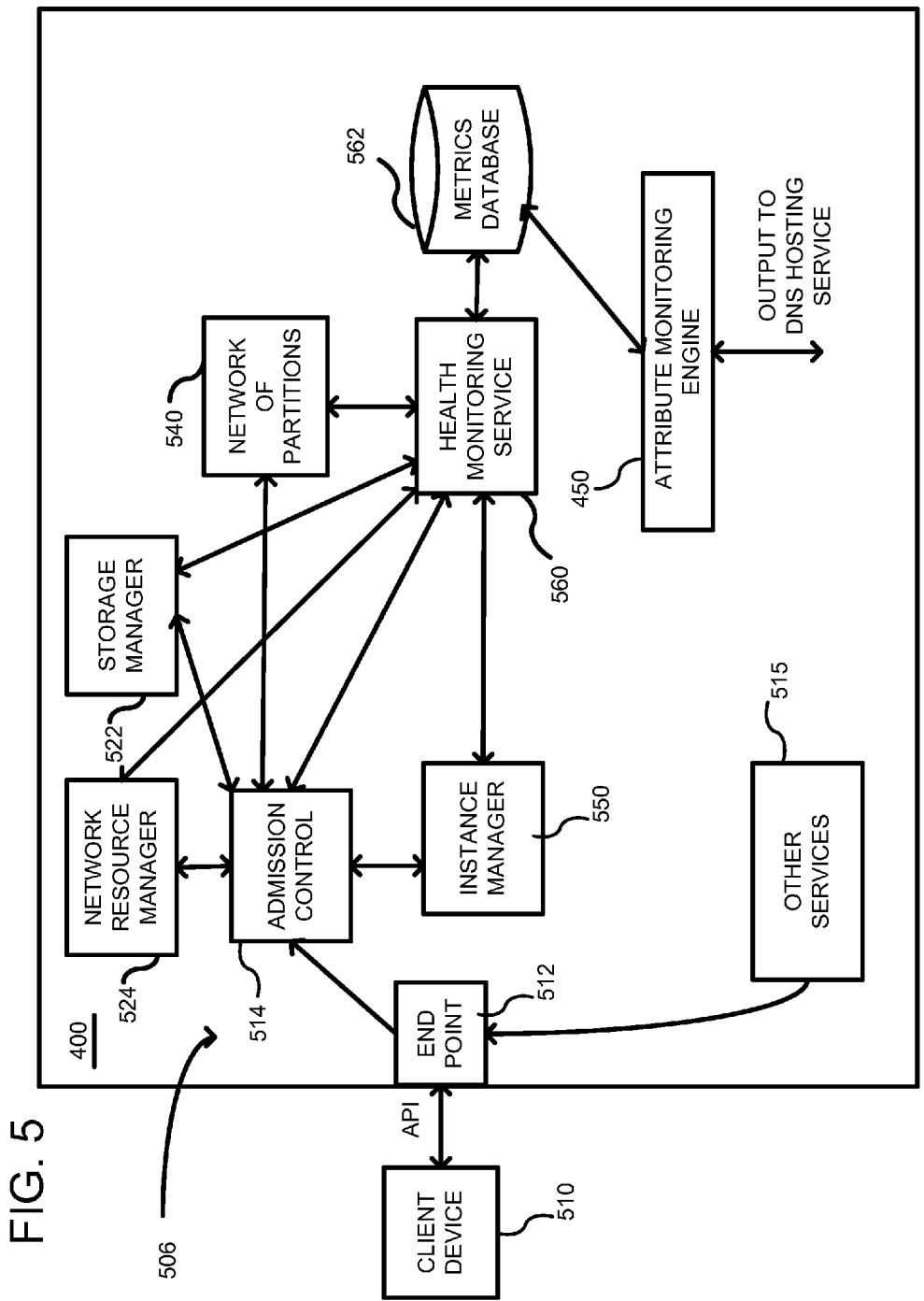
FIG. 5 shows further details of an example system including a plurality of management components associated with a control plane in the multi-tenant environment.

FIG. 5 illustrates in further detail management components 506 that can be used in the multi-tenant environment of the compute service provider 400. In order to access and utilize instances (such as instances 406 of FIG. 4), a client device can be used. The client device 510 can be any of a variety of computing devices, mobile or otherwise including a cell phone, smartphone, handheld computer, Personal Digital Assistant (PDA), desktop computer, etc. The client device 510 can communicate with the compute service provider 400 through an end point 512, which can be a DNS address designed to receive and process API requests. In particular, the end point 512 can be a web server configured to expose an API. Using the API requests, a client 510 can make requests to implement any of the functionality described herein. Other services 515, which can be internal to the compute service provider 400, can likewise make API requests to the end point 512.

Other general management services that may or may not be included in the compute service provider 400 include an admission control 514, e.g., one or more computers operating together as an admission control web service. The admission control 514 can authenticate, validate and unpack the API requests for service or storage of data within the compute service provider 400. An instance manager 550 controls launching and termination of instances in the network. When an instruction is received (such as through an API request) to launch an instance, the instance manager pulls resources from a capacity pool and launches the instance on a decided upon host server computer. As a result, the instance manager 550 knows a geographic location and address of the server computer upon which the instance is launched. Similar to the instance manager are the storage manager 522 and the network resource manager 524. The storage manager 522 relates to initiation and termination of storage volumes, while the network resource manager 524 relates to initiation and termination of routers, switches, subnets, etc. A network of partitions 540 is described further in relation to FIG. 6 and includes a physical layer upon which the instances are launched.

A health monitoring service 560 can provide monitoring for resources and the applications customers run on the compute service provider 400. System administrators can use the monitoring service 560 to collect and track metrics, and gain insight to how applications are running. For example, the monitoring service 560 can allow system-wide visibility into application performance and operational health. Metrics generated by the health monitoring service 560 can be stored in the metrics database 562. The metrics can be virtually any metrics associated with the customer application itself or the server computer upon which the application is executing. Thus, software or hardware metrics can be tracked. Metrics can include load data, cost, health, location, etc. In one example, health of an application can be based on current CPU capacity. Other metrics can be monitored that are indicative of a level of strain on the server computer. Alternatively, the health can be obtained through periodic pings to ensure the application is running. Metrics can also be obtained to network traffic flow through the network resource manager 524. Such metric data can include latency information. The storage manager 522 can also provide storage metrics to the health monitoring service 560. The attribute monitoring engine 450 can determine a cost for executing the customer application by reading the different metrics associated with the customer application. Alternatively, a customer can provide the cost data using the client device 510. The attribute monitoring engine 450 can read the metrics database 562 and use the metrics to output attributes to the DNS hosting service.

Figure 6:
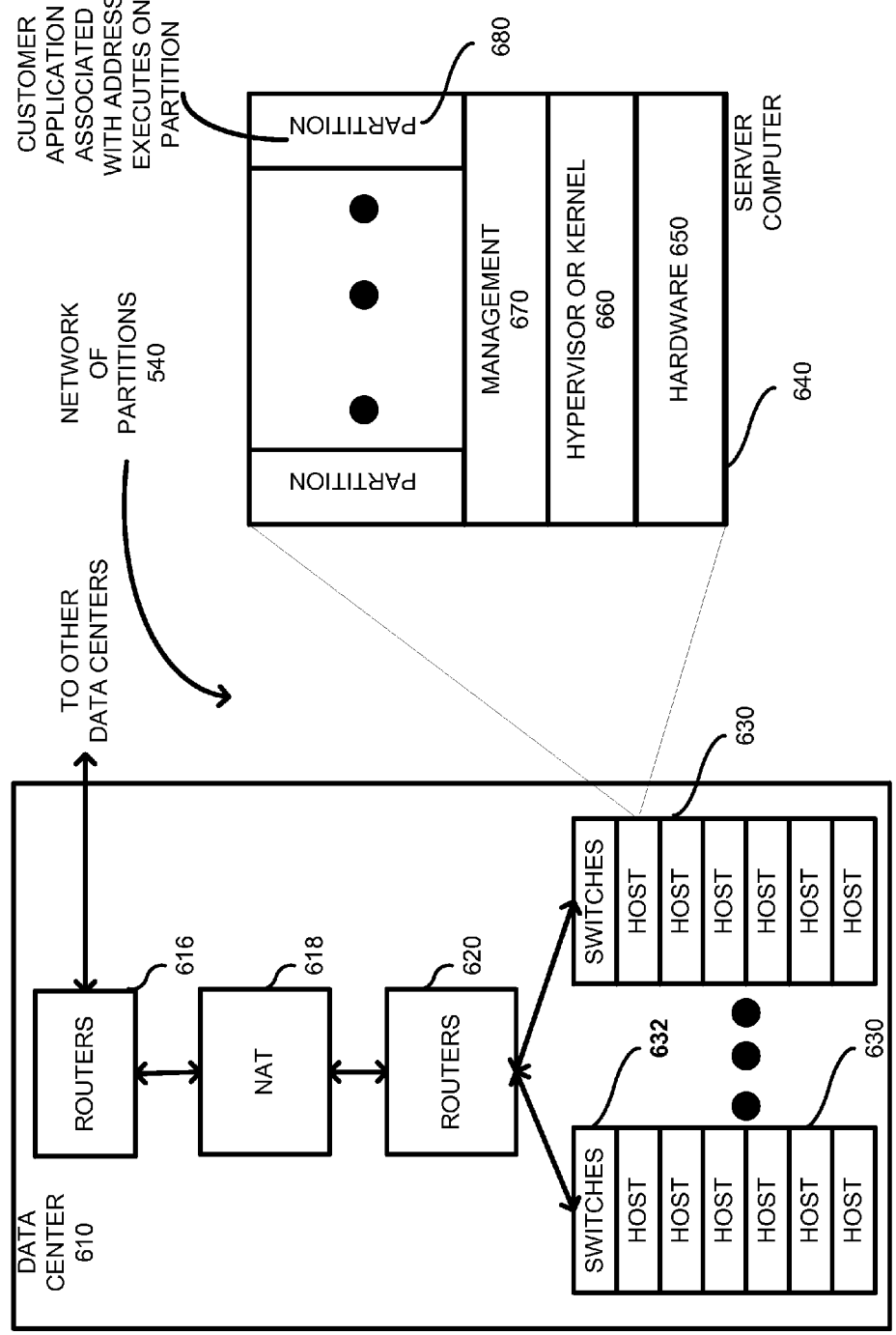
FIG. 6 shows an example of a plurality of host computers, routers and switches, which are hardware assets used for running virtual machine instances. Any of the hardware assets can generate metrics used by the DNS hosting service.

FIG. 6 illustrates the network of partitions 540 and the physical hardware associated therewith. The network of partitions 540 can include a plurality of data centers, such as data center 610, coupled together by routers 616. The routers 616 read address information in a received packet and determine the packet's destination. If the router decides that a different data center contains a host server computer, then the packet is forwarded to that data center. If the packet is addressed to a host in the data center 610, then it is passed to a network address translator (NAT) 618 that converts the packet's public IP address to a private IP address. The NAT also translates private addresses to public addresses that are bound outside of the datacenter 610. Additional routers 620 can be coupled to the NAT to route packets to one or more racks of host server computers 630. Each rack 630 can include a switch 632 coupled to multiple host server computers. A particular host server computer is shown in an expanded view at 640.

Each host 640 has underlying hardware 650 including one or more CPUs, memory, storage devices, etc. Running a layer above the hardware 650 is a hypervisor or kernel layer 660. The hypervisor or kernel layer can be classified as a type 1 or type 2 hypervisor. A type 1 hypervisor runs directly on the host hardware 650 to control the hardware and to manage the guest operating systems. A type 2 hypervisor runs within a conventional operating system environment. Thus, in a type 2 environment, the hypervisor can be a distinct layer running above the operating system and the operating system interacts with the system hardware. Different types of hypervisors include Xen-based, Hyper-V, ESXi/ESX, Linux, etc., but other hypervisors can be used. A management layer 670 can be part of the hypervisor or separated therefrom and generally includes device drivers needed for accessing the hardware 650. The partitions 680 are logical units of isolation by the hypervisor. Each partition 680 can be allocated its own portion of the hardware layer's memory, CPU allocation, storage, etc. Additionally, each partition can include a virtual machine and its own guest operating system. As such, each partition is an abstract portion of capacity designed to support its own virtual machine independent of the other partitions.

Any applications executing on the instances can be monitored using the management layer 670, which can then pass the metrics to the health monitoring service 560 for storage in the metrics database 562. The applications can be considered executing on an application server and in particular embodiments, the application server can be a web server or any server for providing web pages upon request. An agent can execute at the management layer for monitoring the metrics. Additionally, the management layer 670 can pass to the monitoring service 550 the number of instances that are running, when they were launched, the operating system being used, the applications being run, etc. All such metrics can be used for consumption by the health monitoring service 560 and stored in database 562. And such metrics can be used by the attribute monitoring engine 450 to generate the attributes sent to the DNS hosting service.

Figure 7:
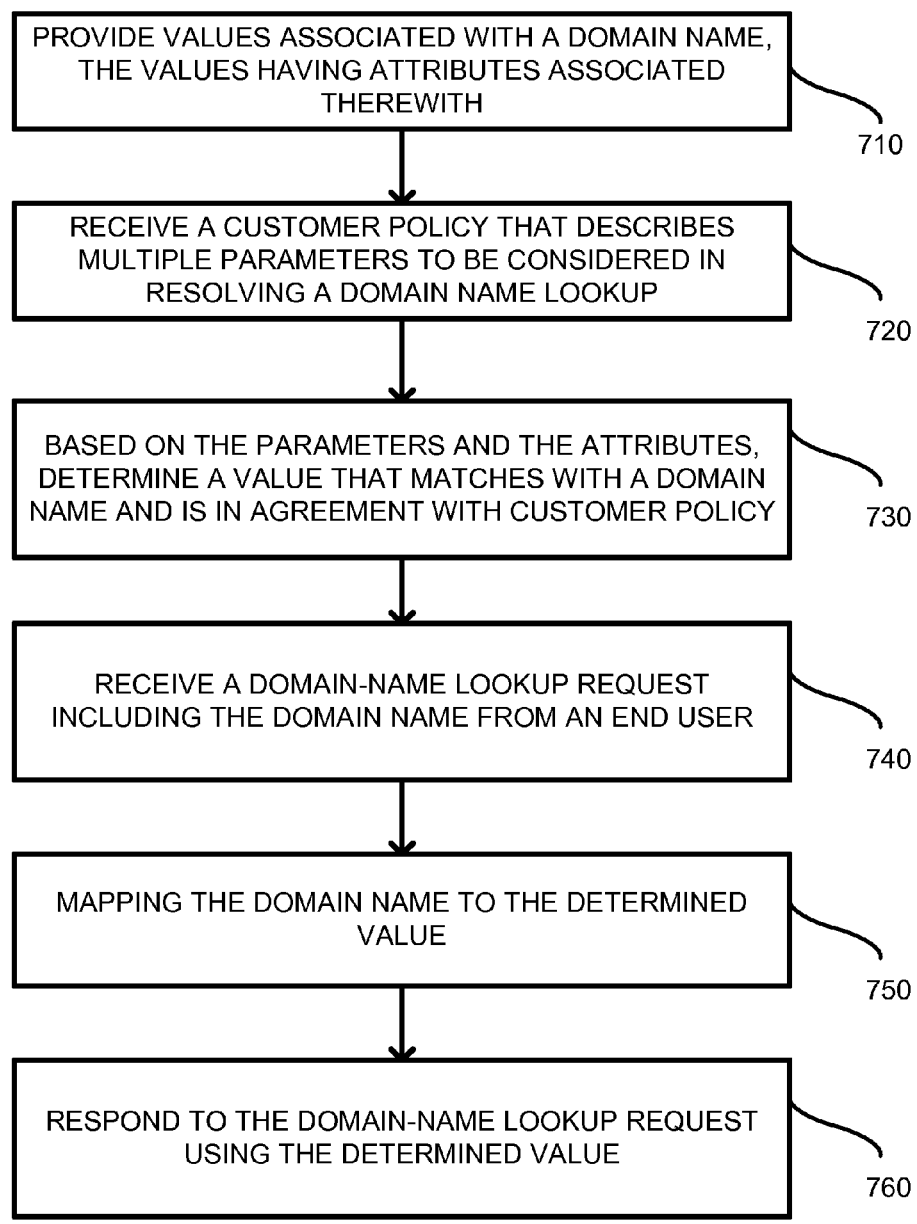
FIG. 7 is a flowchart of a method for implementing a DNS host service according to one embodiment.

FIG. 7 is a flowchart of a method for processing a request for a network resource, such as a DNS request. In process block 710, values associated with a domain name can be provided. For example, the values can be addresses of one or more server computers or a virtual address, such as a virtual machine address. Alternatively, the values can be any desired data, such as text data, addresses, resource identifiers, CNAMES, etc. The values can be a pool of values that can be associated with a domain name, such that a DNS lookup query can be resolved with any of the values within the pool. Each value can have multiple attributes associated therewith. The attributes can be associated with real-time metric data collected from one or more resources of the customer, such as hardware or software resources. The attributes can also be associated with a state of the end user, such as a geographic location of the end user. In process block 720, a customer policy can be received that describes multiple parameters to be considered in resolving a domain name lookup. Thus, the parameters describe a goal of the customer in routing requests to the customer's server computers. The parameters can be related to a state of a client device associated with the end user. For example, the state of the client device can include a geographical location of the client device or a latency associated with network traffic for the client device to communicate with an end point. The parameters can also be related to a state of a customer application. For example, the state of the application can include a current load on the application, a cost associated with a executing the application, a health of the application, or a geographic location of where the application is executing (i.e., the physical location of the server computer). The parameters can be used as a preference list or they can be factors in an optimization problem provided by the customer. Generally, any of the above-described metrics can be associated with the parameters or the attributes.

In process block 730, based on the parameters and the attributes, a determination is made for a value that matches with the customer domain name and in accordance with the customer policy. For example, parameters associated with the customer account can provide a weighting or a preference ordering to specify which attributes are most important. The weighting can then be used with the attributes to determine which value of the pool of values is a best match. Once the determination is made, a DNS record storage can be updated to reflect the selected value. In process block 740, a domain-name lookup request can be received including a domain name from an end user. The domain-name lookup request can be a request from a client device and can be an API or other request type. In process block 750, the domain name can be mapped to the determined value. For example, the domain name can be used as a key for accessing the DNS record storage. Once the appropriate record is found, a value, which is part of the record, can be returned (process block 760).

Figure 8:
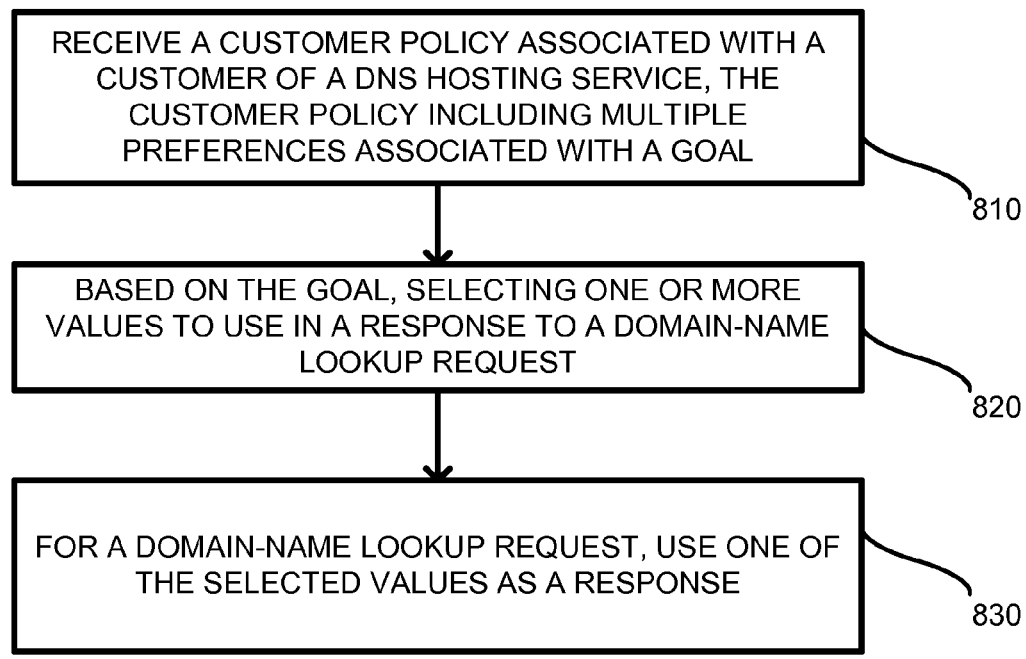
FIG. 8 is a flowchart of a method for implementing a DNS host service according to a second embodiment.

FIG. 8 is a flowchart of a method according to another embodiment. In process block 810, a customer policy is received that is associated with a customer of the DNS hosting service. The customer policy can include multiple preferences associated with a goal indicative of how network traffic should be routed or different answers should be determined for a domain name. The preferences can be used as weighting information during value selection. In one example, the preferences can include a list in a priority order. In another example, the preferences can be used in a weighted equation that is solved by the DNS hosting service. In some embodiments, each value has two or more attributes associated therewith. The attributes can be associated with real-time metric data collected from hardware or software executing for the customer's domain name. In a specific example, the attributes can be associated with dynamically monitoring health of a customer resource (e.g., application, server computer, switch, etc.). Additionally, the attributes can be based on geographic location data of the end user and/or the customer application. The goal can be associated with metrics (e.g., latency <X (where X is any parameter, network hops used <Y (where Y is any value), cost<Z, (where Z is any variable), application health, disk throughput, etc. The goals can be conditional goals, such that customers in certain groups or of a certain type can be treated differently in terms of the goals, or customer applications in a certain state can have a different goal than another state. In process block 820, based on the customer goal, one or more values can be selected for use in a response to a domain-name lookup request. Selection of the values is based on matching the preferences in the customer policy to the attributes associated with the values. Such a matching can be determined by using the preferences as weighting information and summing the weighted attributes. The value having the highest overall score can then be considered the selected value. Other weighted equations can be used so as to effectuate the customer's overall goal. It should be noted that process block 820 can be periodically repeated so as to periodically update which of the one or more values are available based on the customer policy. In process block 830, for a domain-name lookup request, one of the selected values can be used as a DNS response. Thus, the selected values can be placed in a DNS record storage so that a DNS name resolution engine can search the records based on a domain name to find the selected value.

Figure 9:
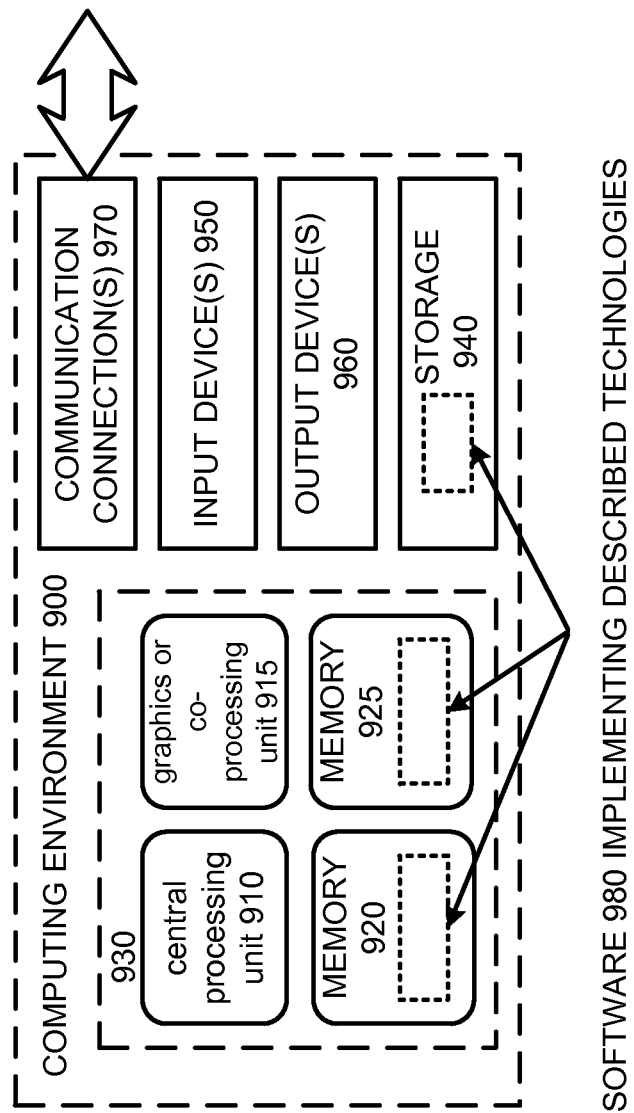
FIG. 9 depicts a generalized example of a suitable computing environment in which the described innovations may be implemented.

FIG. 9 depicts a generalized example of a suitable computing environment 900 in which the described innovations may be implemented. The computing environment 900 is not intended to suggest any limitation as to scope of use or functionality, as the innovations may be implemented in diverse general-purpose or special-purpose computing systems. For example, the computing environment 900 can be any of a variety of computing devices (e.g., desktop computer, laptop computer, server computer, tablet computer, etc.)

With reference to FIG. 9, the computing environment 900 includes one or more processing units 910, 915 and memory 920, 925. In FIG. 9, this basic configuration 930 is included within a dashed line. The processing units 910, 915 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 9 shows a central processing unit 910 as well as a graphics processing unit or co-processing unit 915. The tangible memory 920, 925 may be volatile memory (e.g., registers, cache, RAM), non-volatile memory (e.g., ROM, EEPROM, flash memory, etc.), or some combination of the two, accessible by the processing unit(s). The memory 920, 925 stores software 980 implementing one or more innovations described herein, in the form of computer-executable instructions suitable for execution by the processing unit(s).

A computing system may have additional features. For example, the computing environment 900 includes storage 940, one or more input devices 950, one or more output devices 960, and one or more communication connections 970. An interconnection mechanism (not shown) such as a bus, controller, or network interconnects the components of the computing environment 900. Typically, operating system software (not shown) provides an operating environment for other software executing in the computing environment 900, and coordinates activities of the components of the computing environment 900.

The tangible storage 940 may be removable or non-removable, and includes magnetic disks, magnetic tapes or cassettes, CD-ROMs, DVDs, or any other medium which can be used to store information in a non-transitory way and which can be accessed within the computing environment 900. The storage 940 stores instructions for the software 980 implementing one or more innovations described herein.

The input device(s) 950 may be a touch input device such as a keyboard, mouse, pen, or trackball, a voice input device, a scanning device, or another device that provides input to the computing environment 900. The output device(s) 960 may be a display, printer, speaker, CD-writer, or another device that provides output from the computing environment 900.

The communication connection(s) 970 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

What is claimed is:

1. A method of processing a Domain Name System (DNS) request, the method comprising:
    associating values with a domain name, each value having two or more attributes associated therewith;
    receiving a customer policy associated with a customer of a DNS hosting service, the customer policy describing parameters to be considered in resolving a domain name lookup associated with a service executing on a server computer in a multi-tenant environment, wherein the service is provided by the customer;
    based, at least in part, on the parameters in the customer policy and the attributes associated with the values, determining at least one of the values that matches a domain name and is in agreement with the customer policy;
    populating a DNS record storage with domain names and associated values based on the determination that the values match the domain names and are in agreement with the customer policy;
    receiving a domain name lookup request including the domain name from an end user wherein the domain name is associated with the service provided by the customer;
    associating the domain name to a value by looking up the domain name in the DNS record storage and retrieving the associated value; and
    responding to the domain name lookup request using the associated value.

2. The method of claim 1, wherein the attributes are associated with metric data from one or more resources of the customer.

3. The method of claim 2, wherein the attributes are associated with a state of the end user.

4. The method of claim 1, wherein the customer policy includes a preference list including at least two of the parameters.

5. The method of claim 1, wherein the determining of the value includes using the parameters as weighting of the attributes to match the customer policy.

6. The method of claim 1, wherein the values include an address or a resource identifier.

7. A computer-readable storage including instructions thereon for executing a method of processing a Domain Name System (DNS) request, the method comprising:
    associating values with a domain name, each value having two or more attributes associated therewith;
    receiving, from a customer in a multi-tenant environment, a customer policy associated with a DNS hosting service, the customer policy including multiple preferences associated with a goal indicative of how network traffic should be routed for a domain name of the customer, wherein the domain name is used to access a service of the customer executing on at least one server computer within the multi-tenant environment;
    based, at least in part, on the goal in the customer policy, selecting a value to use in response to a domain name lookup request for the domain name;
    using the selected value and the domain name to generate a DNS storage record, wherein the DNS storage record is populated with the domain names and associated values based on a determination that the values match the domain names and are in agreement with the customer policy; and using the selected value as a response to a domain name lookup request by retrieving the selected value from the DNS storage record.

8. The computer-readable storage of claim 7, wherein the value has two or more attributes associated therewith, the attributes being related to a state of a computing resource associated with the customer.

9. The computer-readable storage of claim 8, wherein the attributes also being related to a state of a client device associated with an end user from which the domain name lookup request was received.

10. The computer-readable storage of claim 8, wherein the state of the application includes one or more of the following: current load on the application, a cost associated with use of the application, a health of the application or a location of where the application is executing.

11. The computer-readable storage of claim 9, wherein the state of the client device includes a geography or a latency associated with network traffic.

12. The computer-readable storage of claim 7, wherein the selecting the value includes matching the multiple preferences in the customer policy to attributes associated with the value.

13. The computer-readable storage of claim 7, wherein the multiple preferences are included in a list in priority order.

14. The computer-readable storage of claim 7, wherein the multiple preferences are used in a weighted equation that is solved by the DNS hosting service.

15. The computer-readable storage of claim 7, further including dynamically monitoring a health of a customer resource and using a health determination to perform the selecting.

16. The computer-readable storage of claim 7, including periodically updating which values are available for selection.

17. The computer-readable storage of claim 7, wherein the value includes an address or a resource identifier.

18. A system for routing network traffic in a multi-tenant environment, comprising:

at least a first server computer operating as a Domain Name System (DNS) hosting service for receiving DNS queries and responding with associated values;

first storage for storing a customer policy associated with a customer of the DNS hosting service, the customer policy including multiple preferences for routing network traffic associated with a domain name of the customer to server computers executing a customer service, wherein the customer policy is supplied to the DNS hosting service through an Application Programming Interface (API) request to the DNS hosting service and wherein the customer policy is considered in resolving a domain name lookup;

second storage for storing multiple candidate values associated with the domain names, the candidate values having attributes associated therewith;

a policy implementation engine for reading the multiple preferences from the customer policy and for determining which of the multiple candidate values should be used in response to domain name requests; and a third storage coupled to the policy implementation engine for storing a DNS record storage that includes domain names and the determined values from the policy implementation engine, wherein the third storage is for receiving a domain name lookup request including the domain name and for associating the domain name to a value by looking up the domain name in the DNS record storage and retrieving the associated value.

19. The system of claim 18, further including an application server computer for executing a customer application and having an agent executing thereon for monitoring hardware metrics of the application server computer.

20. The system of claim 19, wherein the application server is a web server or a server for providing web pages.

21. The system of claim 19, wherein the hardware metrics are indicative of usage of the application server computer.

22. The system of claim 18, wherein the attributes include metrics associated with an end user and metrics associated with computing resources of the customer.

23. The system of claim 18, further including a health monitoring service that monitors server computers executing applications associated with the customer and receiving metrics associated with the applications, the metrics being used for one or more of the attributes.

* * * * *